US005302436A

United States Patent [19]

Miller

[11] Patent Number: 5,302,436

[45] Date of Patent: Apr. 12, 1994

[54] INK RECEPTIVE FILM FORMULATIONS

[75] Inventor: Alan G. Miller, Austin, Tex.

[73] Assignee: Minnesota Mining and Manufacturing Company, St. Paul, Minn.

[21] Appl. No.: 893,384

[22] Filed: Jun. 4, 1992

Related U.S. Application Data

[63] Continuation-in-part of Ser. No. 731,415, Jul. 17, 1991, abandoned.

[51] Int. Cl.[5] .................................... B32B 9/00

[52] U.S. Cl. .................................... 428/195; 428/332; 428/474.4; 428/480; 428/500; 428/688; 106/230

[58] Field of Search ............... 428/199, 206, 207, 216, 428/500, 913, 914, 332, 474.4, 480, 688; 503/214; 106/23 D

[56] References Cited

U.S. PATENT DOCUMENTS

| | | | |
|---|---|---|---|
| 4,085,245 | 4/1978 | De Vito et al. | 428/913 |
| 4,225,652 | 9/1980 | Mercer et al. | 428/515 |
| 4,296,150 | 10/1981 | Mecke et al. | 428/195 |
| 4,300,820 | 11/1981 | Shah | 351/160 |
| 4,369,229 | 1/1983 | Shah | 428/421 |
| 4,379,804 | 4/1983 | Eisele et al. | 428/332 |
| 4,503,111 | 3/1985 | Jaeger | 428/195 |
| 4,775,594 | 10/1988 | Desjarlass | 428/500 |
| 4,820,682 | 4/1989 | Shimomura et al. | 428/913 |
| 4,857,386 | 8/1989 | Butters et al. | 428/206 |
| 4,935,307 | 6/1990 | Iqbal et al. | 428/500 |
| 4,956,225 | 9/1990 | Malhotra | 428/216 |

FOREIGN PATENT DOCUMENTS

| | | | |
|---|---|---|---|
| 0233703B1 | 11/1991 | European Pat. Off. | B41M 1/30 |

*Primary Examiner*—Patrick J. Ryan
*Assistant Examiner*—Wiliam A. Krynski
*Attorney, Agent, or Firm*—Gary L. Griswold; Walter N. Kirn; Darla P. Neaveill

[57] ABSTRACT

A composition suitable for an ink-jet receptive layer comprising from about 1% to about 10% of at least one carboxylic acid having a pKa of from about 2 to about 6, said acid being selected from the group consisting of aryl monocarboxylic acids, aryloxy monocarboxylic acids, alkyl carboxylic acids having alkyl groups containing at least about 11 carbon atoms, dicarboxylic acids, tricarboxylic acids and pyridinium salts, and at least one liquid-absorbent polymer comprising from about 90% to about 99% aprotic constituents, and a transparent sheet suitable for making visual transparencies having a film backing having such ink-receptive layer coated on at least one major surface thereof.

8 Claims, No Drawings

INK RECEPTIVE FILM FORMULATIONS

This is a continuation in part of U.S. Ser. No. 07/731,415 filed Jul. 17, 1991, now abandoned.

BACKGROUND OF THE INVENTION

1. Field of the Invention

This invention relates to improved ink receptive film formulations, and to visual transparencies coated therewith which yield images exhibiting decreased fading of triarylmethane dyes. The transparencies comprise a substantially transparent film backing, and an image-receptive coating thereon which includes specific protic, hydrogen bonding organic-solvent-soluble additives.

b 2. Description of the Related Art

Ink jet printing is an established technique for printing variable information such as labels, multi-color graphics, and the like. Presentation of such information has created a demand for transparent polymeric films which are image-receptive for viewing in a transmission mode. One technique for preparing such articles, commonly known as "visuals" or "transparencies", involves depositing ink on the surface of the sheet to provide the desired images. Recently, computer driven graphic plotting devices have become available which can quickly and precisely generate complex, graphic information. Movement of the ink jet may be computer controlled, and information is therefore printed at electronic speeds.

The graphic plotting devices can generate particularly attractive and effective materials for visual presentation. These plotters conventionally utilize pens containing solvent-based inks which can remain exposed to the air for long periods of time without drying out. However, the nature of the inks required to maintain reasonably long pen life, e.g., low volatility, poses problems in the preparation and handling of the transparencies.

When printing on paper by means of ink jet printers, the images are composed of small dots being spaced to allow diffusion of the ink to cover the area between dots. When printing on film, there is little or no ink spreading. Also, many substrates do not readily accept those inks and the ink will bead up on the surface of the film.

Problems with transparent films also include failure to dry quickly. Some substrates which accept the inks to a greater degree require an extended period of time, e.g., three minutes or more, before the surface is dry enough to handle. This greatly increases the likelihood that the image will be smeared during removal of the transparency from the plotter, or during subsequent handling and stacking of the imaged sheets. Other inking problems are irregular image density, including dots at the end of a pen stroke and severe striations resulting from the multiple, adjacent pen strokes required to "paint" a large block of color, such as when generating a colored bar or pie chart. To help solve these problems, polymeric sheets are usually coated with a transparent liquid-absorbent layer capable of absorbing large quantities of liquid. In addition to pre-imaging requirements, polymeric blends used in ink-receptive layers must also exhibit satisfactory post-imaging quality, such as quick drying and the like.

It is desirable that transparent liquid-absorbing polymeric compositions retain some degree of physical durability, dryness to the touch, and non-tackiness after absorbing significant amounts of water, as would happen during imaging with aqueous inks. Because polymers typically are significantly softened or even dissolved by the absorption of liquids, the required goals of absorption and durability are inconsistent. Attempts at resolving these conflicting goals have resulted in the use of polymer blends.

Compositions useful as transparent liquid-absorbent materials have been formed by blending a liquid-insoluble polymer material with a liquid-soluble polymeric material. The liquid-insoluble material is presumed to form a matrix, within which the liquid-soluble materials reside. Examples of such blends are disclosed in U.S. Pat. Nos. 4,300,820, and 4,369,229, wherein the matrix-forming polymer is a terpolymer comprised of hydrophobic monomeric units, hydrophilic monomeric units, and acid-containing monomeric units, and the liquid-soluble portions of the compositions are polyvinyl lactams. Although these patents do not disclose ink-receptive coatings, the blends disclosed have been found useful as water-absorbent layers capable of retaining a degree of durability.

Other examples of such blends are disclosed in European Patent Application No. EP 0 233 703, wherein water-insoluble acrylic polymers having acid functionality are blended with water-soluble polyvinyl lactams, e.g., polyvinyl pyrrolidone for use as ink-receptive layers on films to be imaged by ink jet printers or pen plotters. However, these formulations do not simultaneously provide adequate drying, low tack, and other required properties when used in many of the commercially available ink jet printers.

U.S. Pat. No. 4,935,307 discloses a hydrophilic polymeric blend which provides improved durability and reduced curl. The blend comprises at least one water-absorbing, hydrophilic polymeric material, at least one hydrophobic polymeric material having acid functionality, and at least one polyethylene glycol.

An additional problem in using various blends of liquid-absorbent polymers is the incompatibility of the matrix-forming insoluble polymer with the liquid being absorbed. For example, if the liquid being absorbed is water, and if the water-insoluble polymers are hydrophobic, some inhibition of water absorption ability can be expected. One method of overcoming this difficulty is to utilize hydrophilic matrix polymers that are not water-soluble at the use temperature, but are water-soluble at other temperatures.

U.S. Pat. No. 4,503,111 discloses ink-receptive coatings comprising either polyvinyl alcohol or gelatin blended with polyvinyl pyrrolidone. Both are water-insoluble at room temperature, are able to act as matrix-forming polymers for these coatings, and the coatings are quite receptive to aqueous inks.

However, the coatings do exhibit a tendency to become tacky, either because of imaging, or because of high humidity. U.S. Pat. Nos. 4,225,652 and 4,379,804 (Eisele), disclose visual transparencies comprising a liquid-absorbent underlayer, and a liquid-permeable protective overlayer. The liquid sorptivity of the underlayer is greater than the liquid sorptivity of the surface layer.

Another problem associated with the use of transparency films with liquid-absorbing coatings is that the images made using certain inks from pen plotters and ink-jet printers are not storage stable when imaged onto such visual transparencies in the ink-receptive layers.

Dark fading, and other distortions of the image color occur after imaging, especially after a period of time has elapsed. Triarylmethane dyes are used in inks for graphic printers and plotter devices. When they are imaged onto either single or multiple transparencies having substantially aprotic characteristics, they tend to react with nucleophilic agents already present. This causes the image to fade or bleach out over time, rendering the image unacceptable for viewing. This fade may cause portions of the image to appear bleached and others to have a distorted color.

It has now been discovered that this fading can be substantially reduced, or even eliminated by the addition of certain protic, hydrogen-bonding, organic-solvent-soluble additives to the formulation of the transparent liquid-absorbent layer of a transparency while maintaining the other required characteristics of a visual transparency such as quick drying, dimensional stability and the like.

SUMMARY OF THE INVENTION

The invention provides an ink receptive formulation having decreased image fading when used with inks containing triarylmethane dyes. The invention further provides a visual transparency comprising a film backing bearing on at least one surface thereof an ink-receptive layer which yields improved images when used with such inks. An ink-permeable protective top layer may also be present.

Receptor formulations of the invention comprise from about 1% to about 10% of at least one protic organic-solvent-soluble additive having a pKa of from about 2 to about 6.

More specifically, receptor formulations of the invention comprise from about 1% to about 10% of at least one carboxylic acid having a pKa of from about 2 to about 6, said acid being selected from the group consisting of aryl monocarboxylic acids, aryloxy monocarboxylic acids, alkyl monocarboxylic acids having alkyl groups containing at least about 11 carbon atoms, dicarboxylic acids, tricarboxylic acids, pyridinium salts and at least one liquid-absorbent polymer comprising from about 90% to about 99% aprotic constituents.

Preferred receptor formulations of the invention comprise from about 1% to about 10% of a dicarboxylic acid having a pKa of from about 2 to about 5, at least one water-absorbing hydrophilic polymeric material, and at least one hydrophobic polymeric material having acid functionality.

Most preferred ink-receptor formulations comprise from about 2% to about 7% phthalic acid.

As used herein, the terms "water-absorbing materials" and "water-absorbing hydrophilic materials" are used to describe materials that are capable of absorbing significant quantities of water, including those which are water-soluble. Monomeric units will be referred to as hydrophobic if they form water-insoluble polymers capable of absorbing only minimal amounts of water when polymerized alone.

All parts, percentages, and ratios herein are by weight unless specifically stated otherwise.

DETAILED DESCRIPTION OF THE INVENTION

Commercially available inks contain not only dyes and solvents but various chemicals which are necessary to provide usefulness of the inks in pen plotters and ink jet printers and ensure such properties as color reliability, pH (buffers), dry-out prevention, easy dispensing, image spreading and the like. Certain of these chemicals are nucleophilic agents, e.g., amines. The inks typically have a polar, protic nature, in which the nucleophiles do not react. However, the polymeric blends frequently used in ink-receptive layers of visual transparencies in order to provide the required absorption and durability are substantially aprotic. Some inks contain dyes which, in such media, will react with the nucleophilic chemicals already present, and the transparency will then exhibit image fading in areas where such dyes comprise a substantial part of the image. Image fading causing more than a 10% decrease in image density is deemed unacceptable.

One class of dyes which react with such nucleophilic agents under these conditions are triarylmethanes having the general formula:

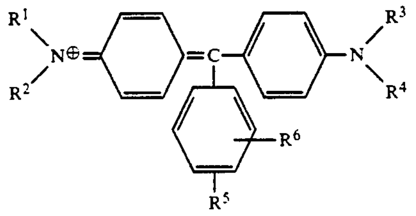

wherein $R^1$, $R^2$, $R^3$, and $R^4$ may be hydrogen, alkyl groups having from about 1 to about 6 carbon atoms, substituted alkyl groups having constituents selected from sulfonate, halogen, alkoxy, cyano, carboxy, hydroxy, aryl, and substituted aryl wherein the substituent group is sulfonate, alkyl, carboxy or halogen, $R^5$ can be hydrogen or

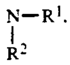, and $R^6$ can be $R^1$ through $R^4$, sulfonate, halogen, alkoxy, cyano, carboxy or hydroxy.

Specific examples of triarylmethane dyes include Crystal Violet, Basic Violet 3, Color Index (CI) 42555; and Erioglaucine, Acid Blue 9, CI 42090.

In order to provide transparencies which do not exhibit such image fading, ink-jet receptive formulations of the invention contain from about 1% to about 10% of an organic acid additive having a pKa of from about 2 to about 6. Typically, these additives can reduce the image density loss to less than 10%, preferably less than 6%.

Carboxylic acids having a pKa of from about 2 to about 5, are preferred. These acids can be monocarboxylic, dicarboxylic, or tricarboxylic acids. Useful monocarboxylic acids are aryl carboxylic acids, aryloxy monocarboxylic acids, and alkyl carboxylic acids having alkyl groups containing at least about 11 carbon atoms, preferably at least about 12 carbon atoms. The incorporation of monocarboxylic acids having lower alkyl groups are ineffective in preventing bleaching of the dyes. This is true even if higher amounts are used.

Useful dicarboxylic acids and tricarboxylic acids also include shorter alkyl chains. Dicarboxylic acids are most preferred, e.g., sebacic acid, succinic acid, adipic acid, suberic acid, and phthalic acid. Phthalic acid is most preferred as it has little or no effect on the coating adhesion for film backings preferably in an amount of from about 2% to about 7%.

Preferred carboxylic acid additives will, when used in ink-receptive formulations of the invention in the requisite amounts, limit the percent density change of an imaged sheet to under 10%, preferably under 7%.

The incorporation of stronger, water-soluble acids having pKa values of less than about 2 is not desirable as they tend not be sufficiently soluble in the aprotic environments of the receptor formulations. Further, the incompatibility of these strong acids may cause additional problems in some formulations such as increased haze and the like. The addition of acids having pKa values of more than 6, e.g., most phenols, will not stabilize the images to an appreciable extent. There may be some improvement seen in individual image colors, but other colors will continue to show extreme fade. Preferred acids have pKa values between 2 and 5.

The ink-receptive layer further comprises a polymeric material wherein at least 90% of the constituents are aprotic, that is, they neither yield nor accept a proton. Aprotic polymers are well known in the art and include e.g., polyvinylpyrrolidone, polyacrylic acid esters, polyethylene oxide, copolymers thereof, and the like.

Preferably the ink-receptive layer comprises a polymeric blend containing at least one water-absorbing, hydrophilic, polymeric material, and at least one hydrophobic polymeric material incorporating acid functional groups. In a highly preferred embodiment, the receptive layer also contains at least one polyethylene glycol.

The water-absorbing hydrophilic polymeric material comprises homopolymers or copolymers of monomeric units selected from vinyl lactams, alkyl tertiary amino alkyl acrylates or methacrylates, alkyl quaternary amino alkyl acrylates or methacrylates, 2-vinylpyridine and 4-vinylpyridine. Polymerization of these monomers can be conducted by free-radical techniques with conditions such as time, temperature, proportions of monomeric units, and the like, adjusted to obtain the desired properties of the final polymer.

Hydrophobic polymeric materials are preferably derived from combinations of acrylic or other hydrophobic ethylenically unsaturated monomeric units copolymerized with monomeric units having acid functionality. The hydrophobic monomeric units must be capable of forming water-insoluble polymers when polymerized alone, and contain no pendant alkyl groups having more than 10 carbon atoms. They also must be capable of being copolymerized with at least one species of acid-functional monomeric unit.

Preferred hydrophobic monomeric units are preferably selected from certain acrylates and methacrylates, e.g., methyl(meth)acrylate, ethyl(meth)acrylate, acrylonitrile, styrene or $\alpha$-methylstyrene, and vinyl acetate. Preferred acid functional monomeric units for polymerization with the hydrophobic monomeric units are acrylic acid and methacrylic acid in amounts of from about 2% to about 20%.

When desired, a polyethylene glycol can be added to the ink-receptive layer for the purpose of curl reduction. Lower molecular weight polyethylene glycols are more effective for reducing curl while maintaining a low level of haze. Accordingly, it is preferred that the polyethylene glycol have a molecular weight of less than 4000.

The ink-receptive formulation can be prepared by dissolving the components in a common solvent. Well-known methods for selecting a common solvent make use of Hansen parameters, as described in U.S. Pat. No. 4,935,307, incorporated herein by reference.

The receptor layer can be applied to the film backing by any conventional coating technique, e.g., deposition from a solution or dispersion of the resins in a solvent or aqueous medium, or blend thereof, by means of such processes as Meyer bar coating, knife coating, reverse roll coating, rotogravure coating, and the like.

Drying of the receptor layer can be effected by conventional drying techniques, e.g., by heating in a hot air oven at a temperature appropriate for the specific film backing chosen. For example, a drying temperature of about 120° C. is suitable for a polyester film backing.

In preferred embodiments of the present invention, an ink-permeable protective layer is applied atop the ink-receptive layer. The preferred material for the ink-permeable layer is polyvinyl alcohol. The protective layer can also include particulate material for the purpose of improving handling and flexibility. Preferred particulate materials include starch and silica. Levels of particulate are limited by the requirement that the final coating be transparent with a haze level of 15% or less, as measured according to ASTM D1003-61 (Reapproved 1979). The preferred mean particle diameter for particulate material is from about 5 to about 25 micrometers, with at least 25% of the particles having a diameter of 15 micrometers or more. Other suitable materials for the protective layer are disclosed in U.S. Pat. Nos. 4,225,652, 4,301,195, and 4,379,804, all of which are incorporated herein by reference.

Additives can also be incorporated into the ink-permeable protective layer to improve processing, including thickeners such as xanthen gum, added to improve coatability.

The composition for the protective layer is preferably prepared by dispersing finely divided polyvinyl alcohol in cold water, agitating the dispersion rigorously, and then gradually heating the dispersion by an external source or by a direct injection of steam. After cooling the dispersion to room temperature, particulate material can be mixed into the dispersion using conventional propeller type power-driven apparatus.

Methods for applying the protective layer are conventional coating methods such as those described, supra.

The carboxylic acids must be incorporated into the ink receptive layer of the imaging sheet, not in the protective layer, and are only useful so long as they remain in this layer.

Film backings may be formed from any polymer capable of forming a self-supporting sheet, e.g., films of cellulose esters such as cellulose triacetate or diacetate, polystyrene, polyamides, vinyl chloride polymers and copolymers, polyolefin and polyallomer polymers and copolymers, polysulphones, polycarbonates and polyesters. Suitable polyester films may be produced from polyesters obtained by condensing one or more dicarboxylic acids or their lower alkyl diesters in which the alkyl group contains up to about 6 carbon atoms, e.g., terephthalic acid, isophthalic, phthalic, 2,5-,2, 6-, and 2,7-naphthalene dicarboxylic acid, succinic acid, sebacic acid, adipic acid, azelaic acid, with one or more glycols such as ethylene glycol, 1,3-propanediol, 1,4-butanediol, and the like.

Preferred film backings are cellulose triacetate or cellulose diacetate, polyesters, especially polyethylene terephthalate, and polystyrene films. Polyethylene terephthalate is most preferred. It is preferred that film backings have a caliper ranging from about 50 micrometers to about 125 micrometers. Film backings having a caliper of less than about 50 micrometers are difficult to handle using conventional methods for graphic materials. Film backings having calipers over 125 micrometers are very stiff, and present feeding difficulties in certain commercially available ink jet printers and pen plotters.

When polyester or polystyrene films supports are used, they are preferably biaxially oriented, and may also be heat set for dimensional stability during fusion of the image to the support. These films may be produced by any conventional method in which the film is biaxially stretched to impart molecular orientation and is dimensionally stabilized by heat setting.

To promote adhesion of the receptor layer to the film backing, it may be desirable to treat the surface of the film backing with one or more primers, in single or multiple layers. Useful primers include those known to have a swelling effect on the film backing polymer. Examples include halogenated phenols dissolved in organic solvents. Alternatively, the surface of the film backing may be modified by treatment such as corona treatment or plasma treatment.

The primer layer, when used, should be relatively thin, preferably less than 2 micrometers, most preferably less than 1 micrometer, and may be coated by conventional coating methods.

Transparencies of the invention are particularly useful in the production of imaged transparencies for viewing in a transmission more, e.g., in association with an overhead projector.

The following examples are for illustrative purposes, and do not limit the scope of the invention, which is that defined by the claims.

Test Methods

Aging Test

A drop of each ink sample is placed on the surface of various films, and doctored off after 10 seconds to give a dye spot. The density of each spot is measured on a "Macbeth TD 903" densitometer using the status A filters. The films are slipsheeted with Xerographic bond paper, placed in a manila envelope and stored in the dark under ambient conditions. After time had elapsed, each dyed spot is again measured and compared to original readings. Densities are measured using a red filter.

EXAMPLES

Preparation of Ink

Inks containing triarylmethane dyes were prepared by dissolving 1% by weight of selected dyes in deionized water. One sample of each ink was used as a control, and is shown with all examples; to two other samples of each ink were added the following nucleophilic materials at a 0.1% by weight concentration:

1. diethanolamine (DEA)
2. tris(hydroxymethyl)aminomethane (TRIS)

Example 1 and Comparative Example 1C

An ink-receptive layer of the invention was prepared by adding 0.15 g of phthalic acid (having a pKa of 2.9) to 15 g of a solution containing 37.1% tetrahydrofuran (THF), 32.3% ethylacetate (EtOAC), 18.6% ethyl alcohol (EtOH), 0.1% of a copolyester, available as Vitel™ PE200 from Goodyear Tire and Rubber Company, 5.3% of a copolymer of methylmethacrylate and acrylic acid having a 91/9 ratio, 6.6% of polyvinylpyrrolidone (PVP), and 1.8% of polyethylene glycol, PEG 600. After thorough mixing, the solution was coated using a knife coater onto an unprimed poly(ethylene terephthalate) (PET) film having a thickness of 100 micrometers to a dry coating weight of 5.2 g/m$^2$. The coated sheet was then dried in an 93° C. oven for about 2 to 3 minutes to remove the solvent.

A second solution containing 2% aqueous solution of polyvinyl alcohol was then coated using a knife coater on top of the ink-receptive layer at a dry coating weight of about 1 g/m$^2$. The composite was again dried in a 93° C. oven for about 2 to 3 minutes to remove solvent.

The coated film was then tested with 3 samples of an ink containing Erioglaucine, Acid Blue 9, C.I. 42090. The first sample had no nucleophilic agents, the second contained 0.1% TRIS and the third sample contained 0.1% DEA, The samples were aged for 184 hours, and the test results are shown in Table 1.

Comparative example C1 was made in the same manner except that no phthalic acid was added. The film was tested with the same ink samples as Example 1, aged for 184 hours and the test results (% red filter percentage change) are also shown in Table I.

TABLE I

| EXAMPLE NO. | ADDITIVES Acid | pKa | Amt. (gm/%) | INK SAMPLES (% Density Chg) Con. | TRIS | DEA |
|---|---|---|---|---|---|---|
| 1 | Phthalic | 2.9 | .15/7.1 | +0.6 | −0.7 | 0 |
| 1C | — | — | — | +0.5 | −21.1 | −22.5 |

As can be seen, the ink-receptive layer of the invention exhibited virtually no loss in image density over a period of many hours. The control experienced a substantial loss in density.

Examples 2-5

Ink-receptive layers according to the invention were made as described in Example 1, except that other additives were used in place of phthalic acid. The additives and their respective pKa values are shown in Table II. These films were tested for density loss with inks containing Acid Blue 9 after 184 hours, and the test results are also shown in Table II.

TABLE II

| EXAMPLE NO. | ADDITIVES Acid | pKa | AMT gm/% | INK SAMPLES (% Density Change) Control | TRIS | DEA |
|---|---|---|---|---|---|---|
| 2 | Succinic | 4.5 | .11/5.2 | −0.6 | −1.3 | 0 |
| 3 | Adipic | 4.5 | .13/5.2 | +0.7 | −4.7 | −0.6 |
| 4 | Suberic | 4.5 | .15/7.1 | −0.7 | −0.6 | −0.6 |
| 5 | Sebacic | 4.5 | .18/8.6 | 0 | −1.8 | −1.8 |
| 6 | Benzoic | 4.2 | .11/5.2 | 0 | −3.9 | −4.2 |

Example 7 and Comparative Examples 8C-9C

These ink-receptive layers were prepared in exactly the same manner as those in Example 1, except that additives having pKa values outside the scope of the invention were substituted for phthalic acid. Example 7 contains 2,4,6,-trichlorophenol; Example 8C contains p-nitrophenol; Example 9C contains pyrogallol. The additives, respective pKa values, and amounts added are shown in Table III. The layers were tested for density loss after 184 hours and the results are reported in Table III.

TABLE III

| EXAMPLE NO. | ADDITIVES Cpd. | pKa | Amt. gm/% | INK SAMPLES (% Density Chg.) Control | TRIS | DEA |
|---|---|---|---|---|---|---|
| 7C | TCP[1] | 6 | .18/8.6 | 0 | −14.9 | −16.3 |
| 8C | Pnp[2] | 7.2 | .12/5.7 | −0.7 | −14 | −13 |
| 9C | Pyrogallol | 9.8 | .11/5.7 | −0.4 | −13.4 | −14.7 |

[1]2,4,6-trichlorophenol
[2]para-nitrophenol

As can be seen from these Examples, while some improvement is obtained, compounds having pKa values above 6 do not as effectively prevent density loss from occurring on the ink-receptive layer, with the density change generally worsening as the pKa value increases.

Examples 11-17 and Comparative Example 11C

These ink-receptive layers were prepared in exactly the same manner as those in Example 1, except that an ink containing crystal violet was used. The test results are shown in Table IV. Trichlorophenol was effective in minimizing fading for this dye, however as mentioned before, it was not as effective in minimizing fading for Acid Blue 9.

TABLE IV

| EXAMPLE NO. | ADDITIVES Acid | pKa | INK SAMPLES (% Density Change) Control | TRIS | DEA |
|---|---|---|---|---|---|
| 11C | Control | — | −0.7 | −12.3 | −12.1 |
| 11 | Adipic | 4.5 | 0 | −1.0 | −0.5 |
| 12 | Succinic | 4.5 | −0.5 | −0.5 | −0.5 |
| 13 | Phthalic | 4.5 | 0 | 0 | 0 |
| 14 | Suberic | 4.5 | 0 | −0.5 | −1.1 |
| 15 | Sebacic | 4.5 | −0.6 | +0.6 | −1.0 |
| 16 | Benzoic | 4.2 | −0.5 | −2.7 | −2.0 |
| 17 | TCP | 6.0 | −0.6 | −2.5 | −2.5 |

Examples 18C-25C

These ink-receptive layers were prepared in the same manner as Example 1 and tested in the same way as Example 1, with 1-C as the control with no additives. These results are shown in Table V. The 1× concentration is such that the molar amounts of the acid additives are equal, the monocarboxylic acids thus having 50% of the carboxylic acid groups of dicarboxylic acids. The 2× concentration has equivalent carboxylic acid groups to the dicarboxylic acids shown in Table VI. As can be seen, short chain alkyl monocarboxylic acids were not effective in minimizing dye fading.

Examples 26-29

Monocarboxylic acids having adequate chain lengths minimize dye fading such that the density change is less than 10%

TABLE V

| Example No. | Acid Additive | Ink Samples (% Density Change) Control 1 × Conc. | Control 2 × Conc. | TRIS 1 × Conc. | TRIS 2 × Conc. | DEA 1 × Conc. | DEA 2 × Conc. |
|---|---|---|---|---|---|---|---|
| 1-C | — | −1.0 | −3.8 | −23.9 | −19.7 | −27.8 | −22.7 |
| 18-C | Acetic | −5.4 | −5.6 | −21.3 | −19.4 | −22.2 | −20.3 |
| 19-C | Propionic | −4.8 | −5.7 | −25.2 | −25.0 | −26.5 | −23.6 |
| 20-C | Butyric | −3.7 | −4.1 | −21.2 | −21.3 | −30.4 | −21.9 |
| 21-C | Valeric | −3.6 | −5.3 | −26.3 | −21.5 | −25.6 | 23.4 |
| 22-C | Hexanoic | −2.8 | −4.0 | −23.1 | −18.6 | −25.2 | −19.3 |
| 23-C | Octanoic | −.8 | −4.2 | −21.0 | −20.0 | −21.2 | 22.8 |
| 24-C | Glycolic | −0.8 | −0.0 | −17.3 | −9.6 | −17.8 | −8.8 |
| 25-C | Decanoic | −2.6 | −3.6 | −17.2 | −17.4 | −19.3 | −15.7 |
| 26 | Lauric | −1.1 | −2.3 | −13.0 | −1.0 | −15.8 | −3.7 |
| 27 | Myristic | −1.1 | −3.4 | −2.6 | −3.0 | −6.3 | −4.9 |
| 28 | Palmitic | −2.5 | −3.9 | −4.9 | −1.7 | −3.6 | −1.7 |
| 29 | Stearic | −1.2 | −1.2 | −4.6 | −2.8 | −5.7 | −2.9 |

Examples 30-37

These were made and tested as in Example 1 and the results are shown in Table VI.

TABLE VI

| Example No. | Acid Additive | Ink Samples (% Density Change) Control | TRIS | DEA |
|---|---|---|---|---|
| 30 | Phenoxyacetic | 0 | +1.0 | −1.0 |
| 31 | t-Cinnamic | 0 | −4.3 | −3.4 |
| 32 | 4-Chlorobenzoic | −1.0 | −4.8 | −3.2 |
| 33 | 1-Naphthoic | +.0 | −1.1 | −1.3 |
| 34 | Pyridinium p-Toluenesulfonate | 0 | −0.5 | −1.6 |
| 35 | Benzoic | 0 | −3.9 | −4.2 |
| 36-C | Methoxyacetic | −1.2 | −23.9 | −23.3 |

As can be seen, methoxy acetic acid, which is a short chain alkoxy monocarboxylic acid also fails to minimize facing to less than a 10% density change.

Examples 38-48

These were made in the same manner as Example 1, except other dicarboxylic acids were used. These were tested also in the same way and the results are reported in Table VII.

TABLE VII

| Example No. | Acid Additive | Ink Samples (% Density Change) Control | TRIS | DEA |
|---|---|---|---|---|
| 38 | Oxalic | 0.0 | 0.0 | 0.0 |

TABLE VII-continued

| Example No. | Acid Additive | Ink Samples (% Density Change) Control | TRIS | DEA |
|---|---|---|---|---|
| 39 | Malonic | 0.0 | −0.8 | −1.6 |
| 40 | Succinic | −.6 | −1.3 | 0 |
| 41 | Glutaric | −1.2 | −2.0 | −2.0 |
| 42 | Adipic | +.7 | −4.7 | −0.6 |
| 43 | Suberic | −0.7 | −0.6 | −0.6 |
| 44 | Sebacic | 0 | −1.8 | −1.8 |
| 45 | 1,10 Decanedicarboxylic | −1.9 | −2.9 | −3.2 |
| 46 | 1,12 Dodecanedicarboxylic | 0 | −3.3 | −3.3 |
| 47 | Phthalic | +.6 | −0.7 | 0 |
| 48 | Tartaric Acid | −0.9 | −0.7 | −1.4 |

What is claimed is:

1. A transparent sheet suitable for making visual transparencies comprising a transparent film backing having a thickness of from about 50 micrometers to about 100 micrometers having coated on at least one major surface thereof an ink-jet receptive layer comprising form about 1% to about 10% of at least one protic organic-solvent-soluble carboxylic acid additive having a pKa of from about 2 to about 6, said acid additive being selected from the group consisting of aryl monocarboxylic acids, aryloxy monocarboxylic acids, alkyl carboxylic acids having alkyl groups containing at least about 11 carbon atoms, dicarboxylic acids and pyridinium salts, and at least one liquid-absorbent polymer comprising from about 90% to about 99% aprotic constituents, wherein said sheet shows reduced image density loss after 184 hours when imaged with an ink containing triarylmethane dye and at least one nucleophile over an identical composition containing no protic organic-solvent-soluble carboxylic acid additive.

2. A transparent sheet according to claim 1 further comprising an ink-permeable protective layer for said ink-receptive layer.

3. A transparent sheet according to claim 1 wherein said protic organic-solvent soluble carboxylic acid additive is a dicarboxylic acid selected from the group consisting of succini acid, sebacic acid, phthalic acid and adipic acid.

4. A transparent sheet according to claim 3 wherein said dicarboxylic acid is phthalic acid.

5. A transparent sheet according to claim 1 comprising a polyethylene terephthalate film backing having coated on at least one major surface thereof a poly-N-vinyl pyrrolidone, a methyl methacrylate/acrylic acid copolymer, at least one polyethylene glycol having a molecular weight of less than about 4000, and phthalic acid, wherein said seed shows reduced fading when imaged with an ink containing a triarylmethane dye and at least one nucleophile over an identical composition containing no protic organic-solvent-soluble carboxylic acid additive.

6. A transparent sheet according to claim 6 further comprising an ink-permeable protective layer coated over said ink-receptive layer.

7. A transparent sheet according to claim 6 wherein said ink-permeable protective layer comprises polyvinyl alcohol and a particulate material.

8. A transparent sheet according to claim 1 wherein the backing is selected from the group consisting of cellulose triacetate, cellulose diacetate, polyesters, polyethylene terephthalate, polystyrene and polycarbonate films.

* * * * *

UNITED STATES PATENT AND TRADEMARK OFFICE

CERTIFICATE OF CORRECTION

PATENT NO. : 5,302,436

DATED : 4/12/94

INVENTOR(S) : Alan G. Miller

It is certified that error appears in the above-identified patent and that said Letters Patent is hereby corrected as shown below:

Column 10, Line 56, "facing" should read --fading--.

Column 12, Line 24, "according to claim 6" should read --according to claim 5--.

Signed and Sealed this

First Day of November, 1994

Attest:

BRUCE LEHMAN

*Attesting Officer*

*Commissioner of Patents and Trademarks*